United States Patent [19]
Lawton

[11] Patent Number: 5,099,607
[45] Date of Patent: Mar. 31, 1992

[54] PLANT GROWTH CONTAINER

[75] Inventor: Peter A. Lawton, Berwick, Australia

[73] Assignee: Ronneby Tree Farm Pty. Ltd., Victoria, Australia

[21] Appl. No.: 612,502

[22] Filed: Nov. 14, 1990

[30] Foreign Application Priority Data

Nov. 20, 1989 [AU] Australia ............... 7490

[51] Int. Cl.⁵ .................................... A45B 3/00
[52] U.S. Cl. .......................... 47/66; 52/245; 229/93; 220/680; 220/692; 220/693
[58] Field of Search ........ 220/680, 692, 693, 627; 47/66; 229/93; 52/169.5, 245

[56] References Cited

U.S. PATENT DOCUMENTS

| | | | |
|---|---|---|---|
| 754,948 | 3/1904 | White | 229/93 |
| 1,011,445 | 12/1911 | Killion | 220/691 |
| 2,829,742 | 4/1958 | Wallace | 52/581 |
| 4,730,953 | 3/1988 | Tarko | 52/169.5 |
| 4,939,865 | 7/1990 | Whitcomb | 47/66 |

*Primary Examiner*—Henry E. Raduazo
*Attorney, Agent, or Firm*—Stevens, Davis, Miller & Mosher

[57] ABSTRACT

A container in which plants are to be grown comprised of a flexible strip of material having a length greater than its width and having an inner and an outer surface. The inner surface is formed in part by a lattice of root guiding recesses, at least some of the recesses being of substantially truncated conical form having a wall which converges towards a hole through the strip. The outer surface is formed in part by a lattice of protruberances at the same relative positional arrangement as the recesses so that when the strip is arranged in a cylinder with its opposite ends overlapping, the protruberances on the outer surface of one end nest within the recesses on the inner surface of the other end at the overlap. Fastening means is provided to hold the strip in that overlapping, nested engagement.

4 Claims, 3 Drawing Sheets

PLANT GROWTH CONTAINER

This invention relates to a plant growth container, and more specifically, to containers suitable for growing plants such as saplings or shrubs which are to be transplanted into the ground at some future time.

Containers of the aforegoing kind may be constructed in various ways, and U.S. Pat. No. 4939865 (Whitcomb) describes one construction which has proved to be reasonably satisfactory in practice. That specification describes a container made up of one or more flexible panels which are connected together in order to form a cylindrical container. The panels have special edge joint configurations which permit individual panels to be disconnected from each other, moved apart, additional panels fitted between the ends so moved apart, and then the container reconnected into a cylinder by connecting together the edge joints thereby increasing the size of the container which accordingly increases the growing volume within the container. Once expanded in this manner, additional growing medium is introduced into the expanded container permitting additional growing space for the roots of the plant growing in the container. The individual panels have an interior surface and an exterior surface and a lattice of root guiding recesses is defined on the inner surface, each of those root guiding recesses leading towards a hole in the wall of the panel. Roots growing within the container are guided by the recesses towards those holes and as they pass through the wall the tip of the roots are air pruned. This air pruning promotes root branching within the container and avoids root spiralling which is a problem with smooth walled containers. Plants growing in containers of this nature thus have a superior root structure which improves the transplantability of the plant.

Various problems have been encountered with the aforementioned system. A first problem arises as a result of the complex construction of the panels. In order to have suitably interlocking edge formations the panels need to have a reasonably robust construction so that the interlocking formations do not simply disengage as pressure increases within the container during growing or whilst the filled container is being handled. The aforementioned Patent Application describes a system wherein the connection arrangement at the edge joint of adjacent panels is a mortice and tenon joint. This construction has proved difficult to interconnect since the edge formations need to be correctly aligned in order for the tenons to fit into the respective mortices to join the panels together.

The panels which have heretofore been used for this type of container have been individually moulded and that manufacturing process adds significantly to the cost of the container. This type of moulding has proved necessary to ensure the edge formations have the requisite strength and inter-engageability.

It is an object of the invention to provide a container for above ground plant growth which is easily adaptable in diameter.

A container according to the invention is comprised of a flexible strip of material having a length greater than its width and having an inner and an outer surface. The inner surface is formed in part by a lattice of root guiding recesses, at least some of the recesses being of substantially truncated conical form having a wall which converges towards a hole through the strip. The outer surface is formed in part by a lattice of protruberances at the same relative positional arrangement as the recesses so that when the strip is arranged in a cylinder with its opposite ends overlapping, the protruberances on the outer surface of one end nest within the recesses on the inner surface of the other end at the overlap. Fastening means is provided to hold the strip in that overlapping, nested engagement.

The invention extends to a method of growing a plant using a container of the invention.

An embodiment of the invention is described in detail in the following passages of the specification which refer to the accompanying drawings. The drawings are, however, merely illustrative of how the invention might be put into effect, so that the specific form and arrangement of the various features as shown is not to be understood as limiting on the invention.

The present invention is particularly concerned with the growth of plants, such as trees and shrubs, in above ground containers prior to the plants being transplanted in to the ground. The main aims of the invention are to provide containers which guide primary roots radially outwardly towards holes in the container walls. As the roots approach the holes they are air pruned resulting in secondary roots branching from the length of the primary roots and thereby forming a well matted and cohesive root ball which is ideal for transplantation.

Figure 1:
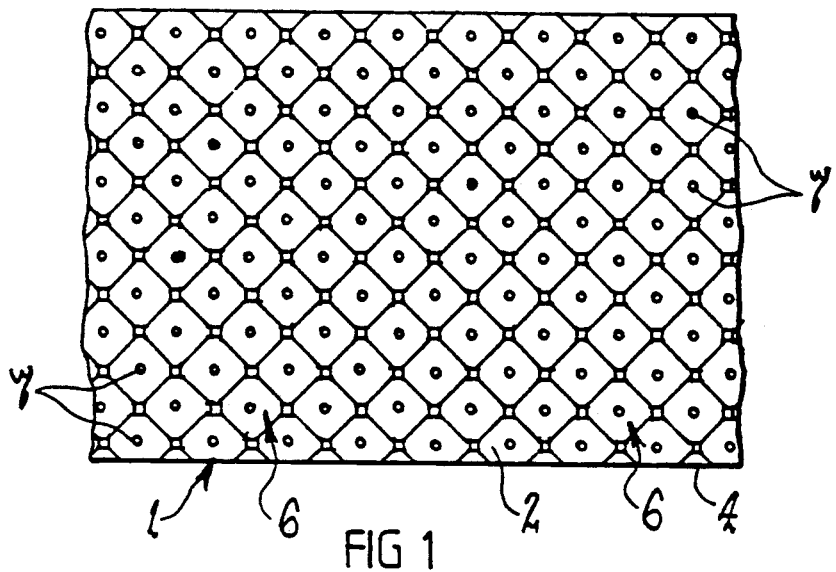
FIG. 1 shows a side elevation view of a strip of material according to one aspect of the invention suitable for forming a container in which a plant may be grown.
Figure 2:
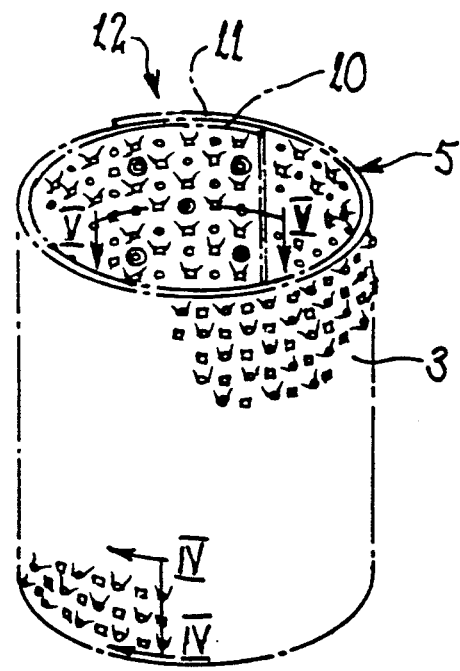
FIG. 2 shows a container of the type which is formed by a strip as shown in FIG. 1.

As shown in FIGS. 1 and 2, a strip 1 of material is shown having an inner surface 2 and an outer surface 3. The strip is preferably formed of a relatively thin thermoplastic sheet material 4 which is rollable or bendable into a circular cylindrical container 5 as shown in FIG. 2. The sheet material is sufficiently rigid and strong so that when formed into an open topped cylindrical container 5 the container 5 is self supporting and is able to be filled with a growing medium such as soil or humus or the like.

The strip 1 has been plastically distorted or contoured so as to provide a lattice of root guiding recesses 6 therein. The root guiding recesses each lead towards a hole 7 through the strip resulting in a lattice of holes 7 over the entire surface of the sheet. Any suitable recess shape is possible although it is preferred that each recess 6 is substantially conically shaped tapering outwardly towards the respective hole 7 to which it leads. It is not essential that each recess 6 leads towards a respective hole 7, but this is the preferred arrangement.

Figure 3:
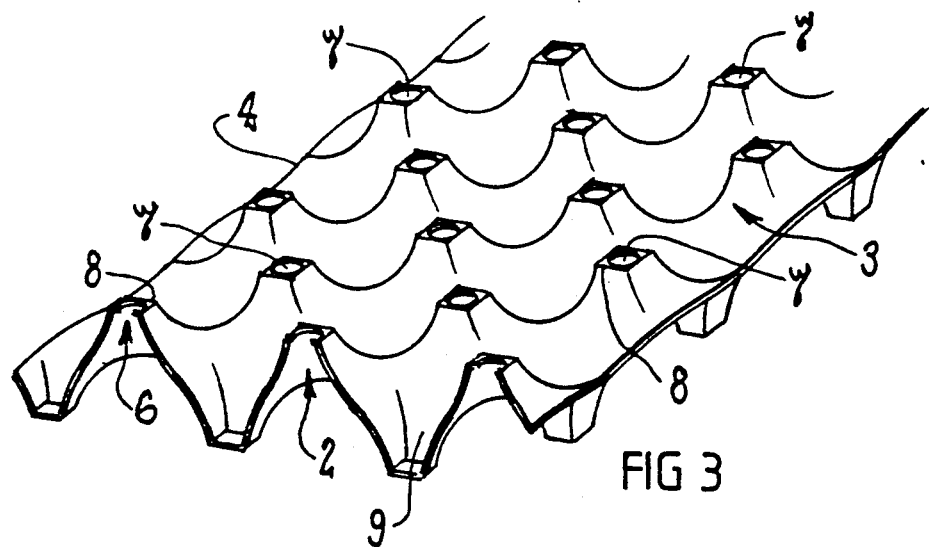
FIG. 3 shows an enlarged perspective view of a portion of the strip of material shown in FIG. 1.

FIG. 3 of the drawings depicts the form of the sheet in more detail. As shown, and as viewed from the outer surface side 3, the sheet 4 is formed by distorting the sheet alternatively inwardly and outwardly in a grid pattern to form a grid of truncated conical peaks 8 and truncated conical recesses 9, the peaks and recesses alternating in both the horizontal and vertical directions. Since the sheet 4 is thin, a peak 8 on the outer surface 3 will form a recess 6 on the inner surface 2, and vice versa, and accordingly the form of the outer surface will be substantially inversely identical to the form of the inner surface. The tip of each peak 8 (as viewed from the outer surface) has been removed to form the holes 7 through the sheet. Thus, when viewed from the inside, each recess 6 is of conical form and leads towards a hole 7 through the sheet.

Since the inner surface 2 is the inverse shape of the outer surface 3 the ends 10,11 of the strip can be overlapped as shown in FIG. 2 so that, at the overlap 12, the peaks 8 on the outer surface of one end 10 nest within the recesses 6 on the inner surface of the other end 11.

Figure 5:
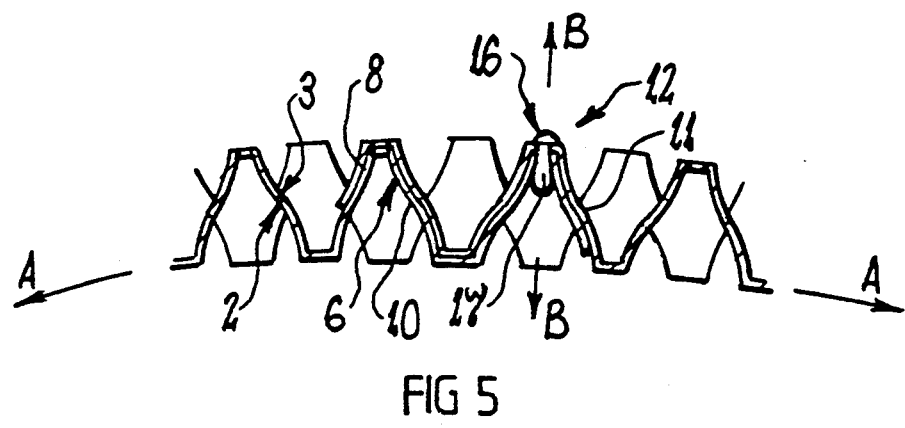
FIG. 5 shows a sectional view along line V—V of FIG. 2.

When the ends 10,11 are in their overlapped condition, as shown in detail in FIG. 5, a fastening means 16 will be provided to hold the two ends 10,11 in that engaged and overlapped condition. The fastening means 16 may comprise a rivet 17, but if it is desirable to reuse, or expand the diameter of the container 5, a releasable fastening means may be provided. For example, a strap or tie which passes through aligned holes 7 at the overlap could be used, or an adjustable strap or belt which extends around the circumference of the container 5 could be used for this purpose.

It will be appreciated that in plant containers a major stress component in the wall of the container is a tensile force which is depicted in FIG. 5 by arrows A. However, if the container 5 is to split at the overlap 12 the resistance to splitting as a result of the interlocking effect achieved by the interlocking of the two ends 10,11 will first need to be overcome. Due to the nesting outer and inner surface arrangement the ends 10,11 will need to move apart in a direction transverse to the direction of arrows A. The tendency to move apart in this manner is resisted by the fastening means 16, and since there is a good interlocking effect achieved by the nesting arrangement the fastening means 16 will not need to be particularly strong. Clearly, the greater the overlap the greater will be the interlocking effect and the more difficult it well be to split the container 5 at the overlap 12.

The diameter of the container 5 will be selected according to requirements. It is envisaged that the strip 1 will be formed in long lengths in a continuous process, and the long lengths will cut to shorter lengths to form individual strips 4 for the containers 5. For the growth of young trees it is envisaged that strips 0.4 m wide and 2.5 m long will be used.

Figure 6:
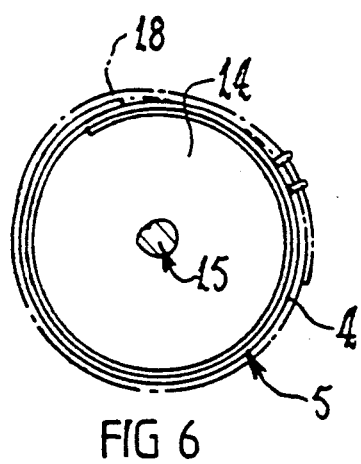
FIG. 6 shows a plan view of the container shown in FIG. 2 with a small diameter.
Figure 8:
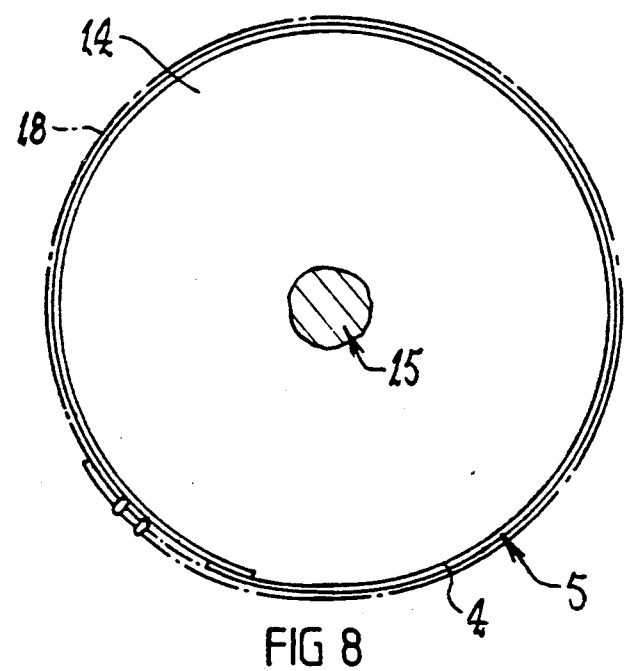
FIG. 8 shows the same container as that of FIG. 6 with the container at its largest diameter.
Figure 7:
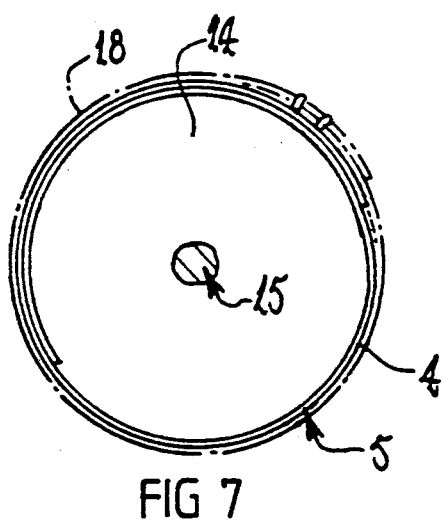
FIG. 7 shows the same container as that of FIG. 6 with an intermediate size diameter.

It is envisaged that for initial growing (i.e. from seedling to the end of the first growing season) the strip will be rolled in a relatively tight roll in which the strip 4 extends twice around the inner volume 14 of the container 5, as depicted in FIG. 6 of the drawings. Thereafter in the second growing season the volume 14 can be increased by disengaging the fastening means 16 (which in FIGS. 6 to 8 is shown as a strap 18) and then disengaging the inner and outer surfaces of the strip 1 and unravelling the roll to increase the diameter of the container to an intermediate size as depicted in FIG. 7 of the drawings. The strap 18 will then be secured around the container 5 to hold it in its increased diameter configuration.

When the diameter of the container 5 is increased in this manner the added volume within the container will be filled with additional growing medium which will add to the space in which roots within the container 5 can grow.

The size of the container can be increased as required until the ends 10 and 11 are in a just overlapping configuration as depicted in FIG. 8 of the drawings. In this configuration the diameter of the container will be about 0.8 m. The tree is depicted in these drawings at numeral 15.

Each time the size of the container 5 is increased the inner surface 2 of the container will be gently disengaged from the root tips and soil, the strip 5 will be unravelled to an extent, and then reconnected with the peaks on the outer surface nesting within the recesses of the inner surface of the overlapping ends. It will be appreciated that disconnection and reconnection will be simple to effect since the outer surface is the inverse shape of the inner surface and thus the two surfaces can be brought into proper engagement, in any position of diametral adjustment, without any difficulty in manipulation or alignment. As the two surfaces are brought together the cone shaped peaks and recesses will guide the two surfaces into proper face to face engagement. The fastening means 16 will then be used to hold the two surfaces in that engaged condition.

The strip 4 can be made from any suitable material although some form of thermoplastic material is considered optimum. It has also been found that a foamed polystyrene material can be used. Foamed polystyrene has heretofore been considered too soft and pliable to form plant growth containers. However, with the superior connection arrangement provided by the overlapping and interlocking ends 10,11 the resistance to shear at the overlap 12 is sufficiently great to allow for the use of this type. Foamed polystyrene is also considered to be a suitable material because of its good heat insulation properties. It is envisaged that a foamed polystyrene material of between 2 mm and 3 mm thickness will be suitable for forming a container 5.

Figure 4:
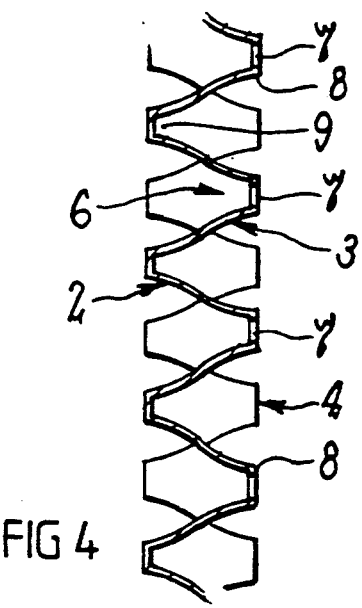
FIG. 4 shows a sectional view along line IV—IV of FIG. 2.

The actual method of distorting the thermoplastics material does not form part of this invention. The sheet material shown in FIGS. 3 to 5 can be formed by distorting a thermoplastic sheet, while it is plastically deformable, with two grids of opposed prongs thereby forming the alternating peaks and recesses on opposite sides of the sheet. The peak tips on the outer surface 3 can be removed by a grinding process to form the holes 7 through the sheet.

Figure 9:
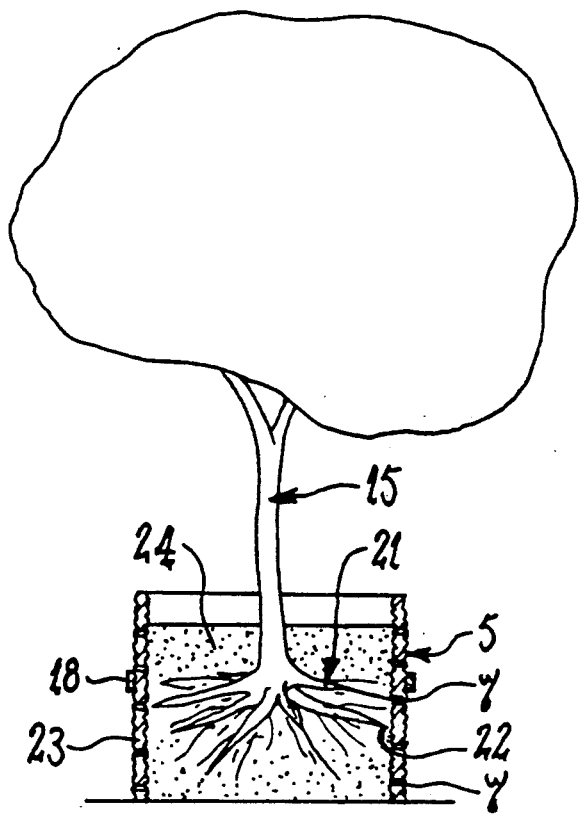
FIG. 9 shows a side sectional view of a sapling growing in a container according to the invention.

A tree 15 is shown growing in a container 5 in FIG. 9. As will be evident, the root structure 21 of the tree 15 is well developed and substantial secondary root branching has occurred as a result of the air pruning of the primary root tips 22 as they pass through the holes 7 in the container wall 23. The container 5 is shown without a base, but a base could be included if necessary. In the absence of a base the root structure 21 should hold the growing medium 24 in a cohesive mass within the container 5.

The claims defining the invention are as follows:

1. A container for growing a plant comprised of a flexible strip of material having a length greater than its width and having an inner and an outer surface, said inner surface being formed in part by a lattice of root guiding recesses, at least some of said recesses being of substantially truncated conical form having a wall which converges towards a hole- through the strip, said outer surface being formed in part by a lattice of protruberances at the same relative positional arrangement as the recesses, said strip arranged in a cylinder with its opposite ends overlapping and the protruberances on the outer surface of one end nesting within the recesses on the inner surface of the other end at the overlap, fastening means being provided to hold the strip in said overlapping, nested engagement.

2. A container according to claim 1 wherein said strip is formed of a relatively thin sheet of plastics material and the formation of said recesses in said inner surface produces said protruberances in said outer surface.

3. A container according to claim 1 wherein each recess leads towards a hole through said strip.

4. A container according to claim 1 wherein the material from which the strip is made is a foamed polystyrene material.

* * * * *